United States Patent Office 2,855,385
Patented Oct. 7, 1958

2,855,385

ISOCYANATES AND PROCESS OF PREPARING SAME

John C. Petropoulos, Norwalk, Conn., assignor to American Cyanamid Company, New York, N. Y., a corporation of Maine No Drawing. Application August 26, 1957
Serial No. 680,385

15 Claims. (Cl. 260—77.5)

This invention relates to a novel class of polymeric materials prepared by reacting a compound containing a plurality of active hydrogen atoms with certain isocyanato isocyanatophenyl indans and to the process of preparing the same. More particularly, this invention relates to the polymeric reaction products of compounds containing a plurality of reactive hydrogen atoms with isocyanato isocyanatophenyl indans and/or isothiocyanato isothiocyanatophenyl indans and to the process of preparing the same.

One of the objects of the present invention is to produce a polymeric reaction product by reacting a compound containing a plurality of active hydrogen atoms with isocyanato isocyanatophenyl indans. A further object of the present invention is to produce polymeric reaction products prepared by reacting compounds containing a plurality of reactive hydrogen atoms such as polyhydric alcohols, polyamines, polyphenols, and the like, with isocyanato isocyanatophenyl indans and to the process of preparing the same. These and other objects of the present invention will be discussed in greater detail hereinbelow.

The isocyanato isocyanatophenyl indans used in the present invention are prepared by reacting a phosgene such as phosgene per se or thiophosgene with an amino aminophenyl indan. The amino aminophenyl indans are prepared by reducing the nitro nitrophenyl indans. The nitro nitrophenyl indans may be prepared by reacting the dimers of an alpha substituted styrene with nitric acid wherein the substituent in the alpha position is an alkyl group containing from 1 to 4 carbon atoms or a halo group. In order that the present invention may be fully understood, the methods for preparing each of the above substituted indans will be set forth hereinbelow starting with the dimerization of the substituted styrenes through the nitrate derivatives, amino derivatives and finally the isocyanato derivatives.

This application is a divisional application of my earlier filed application having the Serial No. 512,335, filed May 31, 1955, entitled "Isocyanates and Process of Preparing the Same" which latter case is a continuation-in-part of my earlier filed application having the Serial No. 414,860, filed March 8, 1954.

The starting materials utilized in the preparation of the isocyanato isocyanatophenyl indans used in the present invention are substituted styrenes having an alkyl group or a halo group in the alpha position. The alkyl group in the alpha position may be any one of methyl, ethyl, propyl, and butyl. The halo group in the alpha position may be chloro, bromo, iodo or fluoro. The ring positions may be either substituted or unsubstituted. If substituted, the substituents may be an alkyl group containing between 1 and 4 carbon atoms or a halo group such as those mentioned above or both. Representative of the class of alkyl substituted styrenes, which may be used in the practice of the process of the present invention are alpha methyl styrene, alpha ethyl styrene, alpha propyl styrene, alpha butyl styrene, alpha chloro styrene, alpha bromo styrene, alpha, ortho dimethyl styrene, alpha, meta-dimethylstyrene, alpha, para-dimethylstyrene, alpha - ethyl - ortho - methylstyrene, alpha - ethyl - meta - methylstyrene, alpha - ethyl - para- methylstyrene, alpha-propyl-ortho-methylstyrene, alpha-propyl - meta - methylstyrene, alpha - propyl - para-methylstyrene, alpha-butyl-ortho-methylstyrene, alpha-butyl - meta - methylstyrene, alpha - butyl - para-methylstyrene, alpha-chloro-meta-methylstyrene, alpha-bromo-para - butylstyrene, alpha - iodo - ortho - propylstyrene, alpha-fluoro-para-ethylstyrene and the like.

In order that the process for the preparation of the dimers utilized in the practice of the process of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Dimerization of α,p-dimethylstyrene*

800 parts of toluene cooled to 5° C. are introduced into a suitable reaction vessel. To the toluene, there is added 140 parts of a 95% sulfuric acid. The mixture is stirred thoroughly and maintained at a temperature of about 0–5° C. To the cooled mixture, there is added 260 parts of α,p-dimethylstyrene dissolved in 200 parts of toluene. The resulting mixture is allowed to react for ½ hour at 0–5° C. and is then hydrolyzed with 120 parts of water. The organic layer is washed free of acidic material with water and is distilled to yield 250 parts of a colorless oil having a boiling point of 142–144° C. at 0.8 mm. This oil solidifies and has a melting point of 37–38° C. uncorrected.

*Dimerization of α-ethyl-p-methylstyrene*

To 400 parts of toluene at 5° C., there is added slowly 70 parts of 95% sulfuric acid followed by 144 parts of α-ethyl-p-methylstyrene dissolved in 100 parts of toluene. The temperature is maintained at 0–10° C. during the entire addition. The resulting mixture is allowed to react for ½ hour and then is hydrolyzed with 100 parts of water. The organic material is collected, washed free of acidic material with water and distilled to yield 130 parts of a colorless liquid having a boiling point of 160–165° C. at 1 mm.

*Dimerization of α,meta-dimethylstyrene*

To 200 parts of toluene at 0–5° C., there is added slowly 35 parts of 95% sulfuric acid, 65 parts of α, m-dimethylstyrene dissolved in 50 parts of toluene. The resulting mixture is allowed to react for about ½ hour and is then hydrolyzed with water. The organic material is collected, washed and distilled to yield 61 parts of a colorless liquid having a boiling point of 144–148° C. at 1 mm. pressure.

*Dimerization of crude α,p-dimethylstyrene*

To 368 parts of toluene at 10° C., there is added slowly 50 parts of anhydrous aluminum chloride followed by 516 parts of crude (undistilled) α,p-dimethylstyrene dissolved in 368 parts of toluene while maintaining the temperature below 10° C. After a 20-minute reaction time, the mixture is hydrolyzed with water and the organic layer is collected and dried. The organic material is distilled to give 150 parts of a colorless oil having a boiling point of 138–140° C. at 0.5–1 mm.

*Dimerization of α,p-dimethylstyrene*

A mixture of 310 parts of freshly distilled α,p-dimethylstyrene and 2 parts of p-toluene sulfonic acid are heated in a steam bath for about 16 hours and then allowed to react at room temperature for 2½ months, at which time the p-toluene sulfonic acid catalyst is removed by washing the organic layer with dilute sodium bicarbonate solution. Distillation of the organic layer gave 151 parts of a very light yellow colored oil having a boiling point of 136–140° C. at 1 mm. pressure.

By dimerizing alpha alkyl styrenes or alpha halo styrenes in a manner comparable to the examples set forth hereinabove, one could produce the following indans which may then be nitrated by reaction with nitric acid to produce nitro nitro phenyl indans: 1-phenyl - 1,3,3 - trimethyl - indan; 1 - phenyl - 1,3 - diethyl - 3 - methyl - indan; 1 - phenyl - 1,3 - dipropyl - 3-methyl - indan; 1 - phenyl - 1,3 - dibutyl - 3 - methyl - indan; 1-phenyl-1,3-dichloro-3-methyl-indan; 1-phenyl-1,3 - diiodo - 3 - methyl - indan; 1 - phenyl - 1,3-dibromo-3 - methyl - indan; 1 - phenyl - 1,3 - difluoro - 3 - methyl-indan; 1 - (4 - methylphenyl) - 1,3,3,6 - tetramethyl-indan; 1-(4-methylphenyl)-1,3-diethyl-3,6-dimethyl-indan, 1 - (4 - methylphenyl) - 1,3 - dipropyl - 3,6 - dimethyl-indan; 1 - (4 - methylphenyl) - 1,3 - dibutyl - 3,6 - dimethyl - indan; 1-(3 - methylphenyl)-1,3,3,5-tetramethyl-indan; 1 - (3 - methylphenyl) - 1,3 - diethyl - 3,5 - dimethyl - indan; 1 - (3 - methylphenyl) 1,3 - dipropyl-3,5 - dimethyl - indan; 1 - (3 - methylphenyl) - 1,3 - dibutyl - 3,5 - dimethyl - indan, 1 - (3 - methylphenyl)-1,3-dichloro-3,5-dimethyl-indan; 1-(3-methylphenyl)-1,3-dibromo-3,5-dimethyl-indan and the like.

In order that the nitration of the indans be more completely understood, the following examples are set forth in which all parts are parts by weight unless otherwise indicated.

*Method for the preparation of 1-(4-methyl-3-nitrophenyl)-1,3,3,6-tetramethyl-5-nitro-indan*

Into a suitable reaction vessel equipped with a thermometer and a stirrer, there is introduced 264 parts of 1-(4-methylphenyl)-1,3,3,6-tetramethyl-indan and 750 parts of chloroform. The charge is cooled to about 0 to 5° C. and there is added, in small increments while constantly stirring, 396 parts of 96% sulfuric acid and 132 parts of 70.4% nitric acid. These acids are added separately but concurrently. The addition of these acids is maintained at a rate of 3 parts of sulfuric per part of nitric acid. The temperature throughout the addition is held at 0–5° C. After the addition is completed, the reaction is permitted to continue for an additional 30 minutes with constant stirring at the same temperature. The stirring is then stopped and the reaction medium separates into two layers. The chloroform layer is neutralized with sodium bicarbonate and the chloroform solution is then concentrated. On standing, pale yellow crystals of 1-(4-methyl-3-nitrophenyl)-1,3,3,6-tetramethyl-5-nitro-indan form. The chloroform is filtered off and the nitro indan is recrystallized from ethanol.

*Preparation of 1-(4-methyl-3-aminophenyl)-1,3,3,6-tetramethyl-5-amino-indan*

70.8 parts of 1-(4-methyl-3-nitrophenyl)-1,3,3,6-tetramethyl-5-nitro-indan (0.2 mol), 67 parts of iron powder (reduced) and 100 parts of 50% ethanol in water are introduced into a suitable reaction vesesl equipped with stirrer, thermometer and reflux condenser. The charge is heated to the reflux temperature whereupon 5.2 parts of concentrated hydrochloric acid in 25 parts of a 50% aqueous solution of ethanol is added slowly. After the addition of the acid solution, the charge is reacted for about 2 hours at reflux. After this two hour heating period, sufficient alcoholic potassium hydroxide to neutralize the acid present in the charge is added and the resultant syrup is filtered hot. The iron precipitate is washed with ethanol and 84 parts of 6 N sulfuric acid are added to the filtrate. Light orange crystals precipitate which have a melting point of 238–241° C. The crystalline precipitate comprising the sulfate salt of the diamine is mixed with 200 parts of water and 100 parts of 6 N sodium hydroxide and the mixture is heated to reflux, whereupon sufficient ethanol is added to give a clear solution. This solution is then refluxed for 1 hour. The solution is cooled and poured into ice water, a light pink precipitate forms. The precipitate is filtered and washed with water until neutral. A light tan sticky solid results which is distilled under vacuum, giving a light yellow liquid which hardens to an amorphous material. The diamino indan produced distilled at 188–189° C. at 0.3 mm. of mercury or 207–208° C. at 0.8 mm. of mercury. The yield was 36 parts, representing 61% of theoretical. The melting point was 90.5–92° C., uncorrected.

*Method for the preparation of 1-(4-methyl-3-isocyanatophenyl)-1,3,3,6-tetramethyl-5-isocyanato-indan*

A solution of 40 parts of dry toluene saturated with phosgene at 0–3° C. is prepared and there is added thereto with constant stirring, 5 parts of 1-(4-methyl-3-aminophenyl) - 1,3,3,6 - tetramethyl - 5 - amino-indan dissolved in dry toluene. A fine white precipitate forms. The charge is heated to 55–60° C. in ½ hour, whereupon a steady stream of phosgene is passed through the reaction mixture. After 20 minutes at 55–60° C., the mixture clears to a yellowish-green solution and the mixture is then brought to reflux. Reflux starts at about 102° C. and is continued for about 2 hours, whereupon the reflux temperature had risen to 109° C. The phosgene stream is then stopped and the solution refluxed for an additional 45 minutes. The toluene is distilled off at atmospheric pressure. When the solution has concentrated to about 10–15 parts, the remainder is distilled under vacuum. 3 parts of 1 - (4 - methyl -3-isocyanatophenyl)-1,3,3,6-tetramethyl-5-isocyanato-indan is produced, which is a pale yellow viscous liquid having a boiling point of 168° C. at 0.2 mm. of mercury. The yield is 51% of theoretical. On standing, the diisocyanato derivative crystallizes out and is recrystallized from heptane giving a white crystalline material with a melting point of 77–79° C., uncorrected.

*Preparation of 1-(4-methyl-3-isothiocyanatophenyl)-1,3,3,6-tetramethyl-5-isothiocyanato-indan*

The preceding example is repeated in substantially all details except that in the place of the phosgene there is utilized thiophosgene in equivalent amounts.

*Preparation of 1-(4-nitrophenyl)-1,3,3-trimethyl-6-nitro-indan*

176 parts of 1,3,3-trimethyl-1-phenyl-indan (0.75 mol) are dissolved in 750 parts of chloroform. To this solution there is added in small increments, 297 parts of 96% sulfuric acid and 99 parts of 70.4% nitric acid while maintaining a temperature at about 0–5° C. during the increment addition. The reaction is permitted to continue for about 3 hours at 0–5° C., after the addition of the mixture of the acids. The chloroform layer is then separated from the acid layer and washed with water and sodium bicarbonate until neutral. Crystallization is induced by scratching. Upon recrystallization from isopropanol, there is produced a pale yellow product that melts at 149.5–151° C.

*Process for the preparation of 1-(4-aminophenyl)-1,3,3-trimethyl-6-amino-indan*

32.6 parts of 1-(4-nitrophenyl)-1,3,3-trimethyl-6-nitroindan, 33.5 parts of iron powder (reduced) and 50 parts of a 50% aqueous solution of ethanol are introduced into a suitable reaction vessel equipped with thermometer, stirrer and reflux condenser. The charge is then heated to reflux. At reflux, there is added 2.6 parts of concentrated hydrochloric acid in 12.5 parts of a 50% aqueous solution of ethyl alcohol slowly. Reaction is continued for about 2 hours after the addition is completed at reflux temperature. The charge is then neutralized with a slight excess of alcoholic potassium hydroxide. The iron powder is filtered off and washed with ethyl alcohol. The filtrate is made alkaline with sodium hydroxide pellets causing the diamino indan to oil out. The resultant oil is digested several times in boiling water giving a brown gummy mass. The diamino indan was crystallized from heptane. Recrystallization from heptane gave a light tan product melting at 93.5–94.5° C.

*Preparation of 1-(4-isocyanatophenyl)-1,3,3-trimethyl-6-isocyanato-indan*

8 parts of 1-(4-aminophenyl)-1,3,3-trimethyl-6-aminoindan are dissolved in 35 parts of dry toluene and the solution is added slowly to a solution of 24 parts of phosgene in 52 parts of dry toluene at 0° C. The temperature of the charge is maintained at 0–3° C. during the addition. On completion of the addition, the mixture is heated gradually to about 55–60° C. in about 40 minutes at which time a steady stream of phosgene is fed into the system. When the mixture had cleared from milky white to a clear, pale yellow solution (in about 30 minutes), the temperature is increased to reflux. After about 1 hour at the reflux temperature, the phosgene stream is shut off and the reaction continued at reflux for an additional 30 minutes. The toluene is then stripped off leaving a viscous orange syrup. The material crystallized on cooling. The diisocyanato indan was recrystallized from hexane to give a solid material having a melting point of 90–93° C. Infra-red analysis confirmed the anticipated structure.

*Preparation of 1-(4-isothiocyanatophenyl)-1,3,3-trimethyl-6-isothiocyanato-indan*

The preceding example is repeated in every essential detail except that in the place of phosgene, there is substituted an equivalent amount of thiophosgene.

In the preparation of the isocyanato isocyanato indans, the following dinitro indans may be utilized as intermediates: 1 - (4 - methyl - 3 - nitrophenyl) - 1,3,3,6 - tetramethyl-5-nitro-indan; 1 - (4-ethyl-3-nitrophenyl)-1,3,3-trimethyl - 6 - ethyl - 5 - nitro - indan; 1 - (4 - propyl - 3 - nitrophenyl)-1,3,3-trimethyl-6-propyl-5-nitro-indan; 1-(4-butyl - 3 - nitrophenyl) - 1,3,3 - trimethyl - 6 - butyl - 5-nitro-indan; 1-(4-chloro-3-nitrophenyl)-1,3,3-trimethyl-6-chloro - 5 - nitro - indan; 1 - (4 - bromo - 3 - nitrophenyl) - 1,3,3 - trimethyl - 6 - bromo - 5 - nitro - indan; 1-(4-nitrophenyl)-1,3,3-trimethyl-6-nitro-indan; 1-(3-nitrophenyl)-1,3,3-trimethyl-5-nitro-indan; 1-(2-nitrophenyl)-1,3,3-trimethyl-4-nitro-indan; 1-(4-methyl-3-nitrophenyl)-1,3 - diethyl - 3,6 - dimethyl - 5 - nitro - indan; 1 - (4-methyl - 3 - nitrophenyl) - 1,3 - dipropyl - 3,6 - dimethyl-5-nitro-indan; 1-(4-methyl-3-nitrophenyl)-1,3-dibutyl-3,6-dimethyl-5-nitro-indan; 1-(4-methyl-3-nitrophenyl)-1,3-dichloro - 3,6 - dimethyl - 5 - nitro - indan; 1 - (4 - methyl - 3 - nitrophenyl) - 1,3 - diiodo - 3,6 - dimethyl - 5-nitro-indan, and the like.

Amongst diamino indans which may be used to prepare the diisocyanato indans of the present invention are the following: 1-(4-methyl-3-aminophenyl)-1,3,3,6-tetramethyl-5-amino-indan; 1-(4-ethyl-3-aminophenyl)-1,3,3-trimethyl - 6 - ethyl - 5 - amino - indan; 1 - (4 - propyl-3 - aminophenyl) - 1,3,3 - trimethyl - 6 - propyl - 5 -amino - indan; 1 - (4 - butyl - 3 - aminophenyl) - 1,3,3 - trimethyl - 6 - butyl - 5 - amino - indan; 1 - (4 - chloro - 3-aminophenyl - 1,3,3 - trimethyl - 6 - chloro-5-amino-indan; 1 - (4 - bromo - 3 - aminophenyl) - 1,3,3-trimethyl - 6-bromo - 5 - amino - indan; 1 - (4 - aminophenyl) - 1,3,3-trimethyl - 6 - amino - indan; 1 - (3 - aminophenyl)-1,3,3-trimethyl - 5 - amino - indan; 1 - (2 - aminophenyl)-1,3,3-trimethyl - 4 - amino - indan; 1 - (4 - methyl - 3-aminophenyl) - 1,3 - diethyl - 3,6 - dimethyl - 5 - amino-indan; 1 - (4 - methyl - 3 - aminophenyl) - 1,3 - dipropyl-3,6-dimethyl - 5 - amino-indan; 1 - (4 - methyl - 3 - aminophenyl) - 1,3 - dibutyl - 3,6 - dimethyl - 5 - amino-indan; 1 - (4 - methyl - 3 - aminophenyl) - 1,3 - dichloro-3,6 - dimethyl - 5 - amino-indan; 1 - (4 - methyl - 3 - aminophenyl)-1,3-diiodo-3,6-dimethyl-5-amino-indan, and the like.

Amongst the diisocyanato indans which may be prepared in accordance with the present invention are the following: 1 - (4 - methyl - 3 - isocyanatophenyl) - 1,3,3,6 - tetramethyl - 5 - isocyanato - indan; 1 - (4 - ethyl-3 - isocyanatophenyl) - 1,3,3 - trimethyl - 6 - ethyl - 5-isocyanato - indan; 1 - (4 - propyl - 3 - isocyanatophenyl) - 1,3,3 - trimethyl - 6 - propyl - 5 - isocyanato - indan; 1 - (4 - butyl - 3 - isocyanatophenyl) - 1,3,3 - trimethyl-6 - butyl - 5 - isocyanato - indan; 1 - (4 - chloro - 3 - isocyanatophenyl) - 1,3,3 - trimethyl - 6 - chloro - 5 - isocyanato - indan; 1 - (4 - bromo - 3 - isocyanatophenyl)-1,3,3 - trimethyl - 6 - bromo - 5 - isocyanato - indan; 1 - (4 - isocyanatophenyl) - 1,3,3 - trimethyl - 6 - isocyanato - indan; 1 - (3 - isocyanatophenyl) - 1,3,3 - trimethyl - 5 - isocyanato - indan; 1 - (2 - isocyanatophenyl) - 1,3,3 - trimethyl - 4 - isocyanato - indan; 1 - (4-methyl - 3 - isocyanatophenyl) - 1,3 - diethyl - 3,6 - dimethyl - 5 - isocyanato - indan; 1 - (4 - methyl - 3 - isocyanatophenyl) - 1,3 - dipropyl - 3,6 - dimethyl - 5 - isocyanato - indan; 1 - (4 - methyl - 3 - isocyanatophenyl)-1,3 - dibutyl - 3,6 - dimethyl - 5 - isocyanato - indan; 1-(4 - methyl - 3 - isocyanatophenyl) - 1,3 - dichloro - 3,6-dimethyl - 5 - isocyanato - indan; 1 - (4 - methyl - 3 - isocyanatophenyl) - 1,3 - diiodo - 3,6 - dimethyl - 5 - isocyanato - indan; 1 - (4 - methyl - 3 - isothiocyanatophenyl) - 1,3,3,6 - tetramethyl - 5 - isothiocyanato - indan; 1 - (4 - ethyl - 3 - thiocyanatophenyl) - 1,3,3 - trimethyl-6 - ethyl - 5 - isothiocyanato - indan; 1 - (4 - propyl - 3-isothiocyanatophenyl) - 1,3,3 - trimethyl - 6 - propyl - 5-isothiocyanato - indan; 1 - (4 - butyl - 3 - isothiocyanatophenyl) - 1,3,3 - trimethyl - 6 - butyl - 5 - isothiocyanato-indan; 1 - (4 - chloro - 3 - isothiocyanatophenyl) - 1,3,3-trimethyl - 6 - chloro - 5 - isothiocyanato - indan; 1 - (4-bromo - 3 - isothiocyanatophenyl) - 1,3,3 - trimethyl - 6-bromo - 5 - isothiocyanato - indan; 1 - (4 - isothiocyanatophenyl) - 1,3,3 - trimethyl - 6 - isothiocyanato - indan; 1 - (3 - isothiocyanatophenyl) - 1,3,3-trimethyl - 5 - isothiocyanato - indan; 1 - (2 - isothiocyanatophenyl) - 1,3, 3 - trimethyl - 4 - isothiocyanato - indan; 1 - (4 - methyl-3 - thiocyanatophenyl) - 1,3 - diethyl - 3,6 - dimethyl - 5-isothiocyanato - indan; 1 - (4 - methyl - 3 - isothiocyanatophenyl) - 1,3 - dipropyl - 3,6 - dimethyl - 5 - isothiocyanato - indan; 1 - (4 - methyl - 3 - isothiocyanato)-1,3 - dibutyl - 3,6 - dimethyl - 5 - isothiocyanato - indan; 1 - (4 - methyl - 3 - isothiocyanatophenyl) - 1,3 - dichloro-3,6 - dimethyl - 5 - isothiocyanato - indan; 1 - (4 - methyly - 3 - isothiocyanatophenyl) - 1,3 - diiodo - 3,6 - dimethyl-5-isothiocyanato-indan, and the like.

The diisocyanato indans and the diisothiocyanato indans disclosed herein above have been found to be exceedingly useful in preparing polymeric materials by reacting the same with a compound having a plurality of active hydrogen atoms. For instance, these cyanato indans may be used in resinous compositions such as unsaturated polyester resinous compositions where a foamed resinous material is desired. These unsaturated polyester resinous compositions are illustrated in considerable detail in the U. S. Patents 2,255,313, 2,409,633, 2,443,735–41, inclusive, and 2,510,503. Additionally, the diisocyanato and dithiocyanato indans of the present invention may be utilized in coreaction with alcohols such as polyhydric alcohols; amines, such as polyamines, phenols, such as polyphenols and polycarboxylic acids to form resinous materials. These resinous materials may be used for the production of coating compositions, laminating compositions, molding compositions, castings, adhesives and the like.

Among the polyhydric alcohols which may be reacted with the isocyanato indans of the present invention are ethylene glycol, diethylene glycol, trimethylene glycol, tetramethylene glycol, trimethylol ethane, trimethylol propane, glycerol, pinacol, arabitol, xylitol, adonitol, mannitol, sorbitol, pentaerythritol, dipentaerythritol or any polyhydric alcohols shown in my copending application having the Serial No. 489,793, filed February 21, 1955, and the like. In reacting with these diisocyanato indans, these polyhydric alcohols may be used either singly or in combination with one another.

Among the polyamines which may be used to form resinous materials by reacting with the diisocyanato indans of the present invention are ethylene diamine, diethylene triamine, triethylene tetramine, tetraethylene pentamine, 3,3' - iminobispropylamine, tris - (3 - aminopropyl) amine, N,N-(2-hydroxyethyl-2'-aminoethyl) amine, N,N-(3-hydroxypropyl-3'-aminopropyl) amine, or any of the diamino indans shown hereinabove.

Among the diphenols that may be used to form resinous materials by reaction with the dicyandiamide indans of the present invention are p,p'-dihydroxy diphenyl dimethyl methane, p,p'-dihydroxy benzophenone, p,p'-dihydroxy diphenyl or any of the diphenols shown in my copending application having the Serial No. 443,971, filed July 16, 1954. These diphenols may be used either singly or in combination with one another.

In the preparation of the diisocyanato indans used in the present invention, one should react more than two mols of phosgene or thiophosgene per mol of diamino indan. This reaction may be carried out over a rather wide range of temperatures such as between about −40° C. and reflux. Ordinarily, it is preferred that the reaction be carried out in the presence of an inert organic solvent such as benzene, toluene, xylene, kerosene, dichlorobenzene or mineral spirits such as Varsol No. 1, Varsol No. 2 and the like. For best yields, it is preferred to carry out the reaction at a relatively low temperature such as between about −10° C. and +10° C. during the initial portion of the reaction while insuring that an excess amount of phosgene or thiophosgene is present in the sphere of reaction. The temperature may then be increased gradually while continuing to pass the phosgene gas through the system and finally heating at reflux temperatures to complete the reaction. When the reaction is completed, the solvent is distilled off and the residue may be washed, crystallized and even recrystallized to produce a pure diisocyanato derivative. The reaction may be carried out either batch-wise or by continuous operation and in the latter instance, it will be possible to recycle materials such as the phosgene. If desired, one can form the hydrochloride salt of the diamino indan and said salt can be reacted with the phosgene or thiophosgene to produce the diisocyanato derivative.

In order to illustrate the preparation of resinous materials using the isocyanato indan of the present invention, the following examples are set forth in which all parts are parts by weight. These examples are set forth primarily for the purpose of illustration and any specific enumeration of detail contained therein should not be interpreted as a limitation on the case except as is indicated in the appended claims.

Example 1

Into a suitable reaction vessel equipped with thermometer, and stirrer, there is introduced 60.5 parts of 1-(4-isocyanatophenyl)-1,3,3-trimethyl-6-isocyanato-indan dissolved in 1,000 parts of heptane and there is added thereto, in small increments, 12.9 parts of trimethylene diamine. Exothermic reaction occurs with immediate formation of a white precipitate, which had the following properties: Softening point, 210° C.; melting point, 230–240° C.

Example 2

Into a suitable reaction vessel equipped with thermometer, stirrer and reflux condenser, there is introduced 31.8 parts of 1-(4-isocyanatophenyl)-1,3,3-trimethyl-6-isocyanato-indan in 1200 parts of heptane. There is added thereto 6.2 parts of ethylene glycol. The reactants are heated gradually to reflux and held at that temperature for about 5 minutes. A light brown precipitate forms which has a softening point of 165° C.

Example 3

31.8 parts of 1-(4-isocyanatophenyl)-1,3,3-trimethyl-6-isocyanato-indan in 600 parts of methyl ethyl ketone are introduced into a suitable reaction vessel equipped with thermometer, stirrer and reflux condenser. There is added thereto 14.6 parts of adipic acid. The charge is heated gradually to the reflux temperature and held at that temperature for about 10 minutes. The solvent is then stripped off. On cooling, a crystalline material is produced which melts at 145–160° C. to a viscous melt and remained a viscous melt with some decomposition up to 280° C.

Example 4

34.6 parts of 1-(4-methyl-3-isocyanatophenyl)-1,3,3,6-tetramethyl-5-isocyanato-indan are dissolved in 100 parts of heptane. 7.4 parts of trimethylene diamine are added. The polyurea which forms precipitates from solution as a white powderous material.

Example 5

34.6 parts of 1-(4-methyl-3-isocyanatophenyl)-1,3,3,6-tetramethyl-5-isocyanato-indan are dissolved in 100 parts of heptane. 6.2 parts of ethylene glycol are added. The polyurethane, which forms, precipitates from solution on standing.

Example 6

100 parts of polyethylene adipate (hydroxyl number equals 50) are heated to 110° C., whereupon 10 parts of 1 - (4 - methyl - 3 - isocyanatophenyl) - 1,3,3,6 - tetramethyl-5-isocyanato-indan are added. The reaction mixture is heated for 20 minutes at 110–120° C. At the end of the reaction time, 1 part of tolylene diamine is added. The viscosity increases almost to a gel. The product is cured by heating the mass for 1 hour at 150° C. The resultant product is a tough, rubbery sheet.

Generally speaking, the diisocyanato indans of the present invention, including the diisothiocyanato indans, may be reacted with any compound containing an active hydrogen atom which includes compounds which are capable of substitution by a metal. For polymeric purposes, these compounds should contain at least two active hydrogen atoms. In addition to those set forth hereinabove, there is included such compounds as water, amides, anhydrides, ammonia, Grignard reagents, and the like.

I claim:

1. A process comprising reacting a compound having a plurality of active hydrogen atoms with a compound having the general formula:

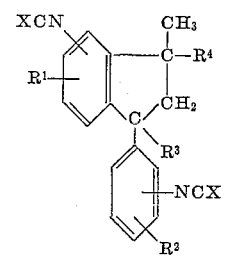

wherein R¹ and R² are members selected from the group consisting of H, an alkyl group containing 1 to 4 carbon atoms, and a halo group, R³ and R⁴ are members selected from the group consisting of an alkyl group containing 1 to 4 carbon atoms, and a halo group, and X is a member selected from the group consisting of S and O to produce a resinous material.

2. A process comprising reacting a compound having a plurality of active hydrogen atoms with a compound having the general formula:

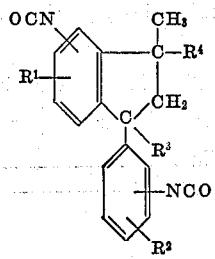

wherein $R^1$ and $R^2$ are members selected from the group consisting of H, an alkyl group containing 1 to 4 carbon atoms, and a halo group, $R^3$ and $R^4$ are members selected from the group consisting of an alkyl group containing 1 to 4 carbon atoms, and a halo group to produce a resinous material.

3. A process comprising reacting a compound having a plurality of active hydrogen atoms with a compound having the general formula:

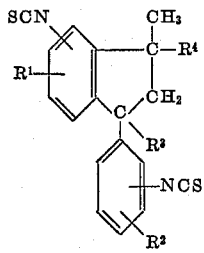

wherein $R^1$ and $R^2$ are members selected from the group consisting of H, an alkyl group containing 1 to 4 carbon atoms, and a halo group, $R^3$ and $R^4$ are members selected from the group consisting of an alkyl group containing 1 to 4 carbon atoms, and a halo group to produce a resinous material.

4. A process comprising reacting a compound having a plurality of active hydrogen atoms with 1-(3-isocyanatophenyl)-1,3,3-trimethyl-5-isocyanato-indan to produce a resinous material.

5. A process comprising reacting a compound having a plurality of active hydrogen atoms with 1-(3-isothiocyanatophenyl)-1,3,3-trimethyl-5-isothiocyanato-indan to produce a resinous material.

6. A process comprising reacting a polyhydric alcohol with a compound having the general formula:

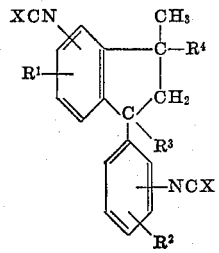

wherein $R^1$ and $R^2$ are members selected from the group consisting of H, an alkyl group containing 1 to 4 carbon atoms, and a halo group, $R^3$ and $R^4$ are members selected from the group consisting of an alkyl group containing 1 to 4 carbon atoms, and a halo group, and X is a member selected from the group consisting of S and O to produce a resinous material.

7. A process comprising reacting a polyamine with a compound having the general formula:

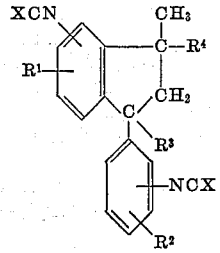

wherein $R^1$ and $R^2$ are members selected from the group consisting of H, an alkyl group containing 1 to 4 carbon atoms, and a halo group, $R^3$ and $R^4$ are members selected from the group consisting of an alkyl group containing 1 to 4 carbon atoms, and a halo group, and X is a member selected from the group consisting of S and O to produce a resinous material.

8. The resinous reaction product of a compound having a plurality of active hydrogen atoms with a compound having the general formula:

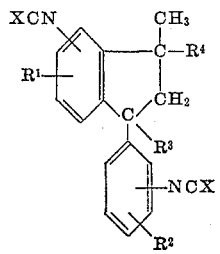

wherein $R^1$ and $R^2$ are members selected from the group consisting of H, an alkyl group containing 1 to 4 carbon atoms, and a halo group, $R^3$ and $R^4$ are members selected from the group consisting of an alkyl group containing 1 to 4 carbon atoms, and a halo group, and X is a member selected from the group consisting of S and O.

9. The resinous reaction product of a compound having a plurality of active hydrogen atoms with a compound having the general formula:

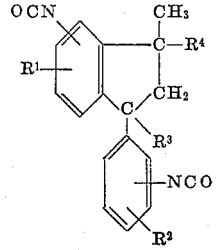

wherein $R^1$ and $R^2$ are members selected from the group consisting of H, an alkyl group containing 1 to 4 carbon atoms, and a halo group, $R^3$ and $R^4$ are members selected from the group consisting of an alkyl group containing 1 to 4 carbon atoms, and a halo group.

10. The resinous reaction product of a compound having a plurality of reactive hydrogen atoms with a compound having the general formula:

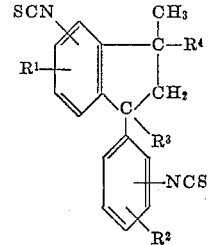

wherein $R^1$ and $R^2$ are members selected from the group consisting of H, an alkyl group containing 1 to 4 carbon atoms, and a halo group, $R^3$ and $R^4$ are members selected from the group consisting of an alkyl group containing 1 to 4 carbon atoms, and a halo group.

11. The resinous reaction product of a compound having a plurality of reactive hydrogen atoms with 1-(3-isocyanatophenyl)-1,3,3-trimethyl-5-isocyanato-indan.

12. The resinous reaction product of a compound having a plurality of reactive hydrogen atoms with 1-(3-isothiocyanatophenyl) - 1,3,3 - trimethyl - 5 - isothiocyanato-indan.

13. The resinous reaction product of a polyhydric alcohol with 1-(3-isocyanatophenyl)-1,3,3-trimethyl-5-isocyanato-indan.

14. The resinous reaction product of a polyamine with 1-(3-isocyanatophenyl)-1,3,3-trimethyl - 5 - isocyanato-indan.

15. The resinous reaction product of a polyamine with 1-(3-isothiocyanatophenyl)-1,3,3-trimethyl - 5 - isothiocyanato-indan.

References Cited in the file of this patent

UNITED STATES PATENTS

| | | |
|---|---|---|
| 2,284,637 | Catlin | June 2, 1942 |
| 2,754,285 | Petropoulos | July 10, 1956 |

UNITED STATES PATENT OFFICE

CERTIFICATE OF CORRECTION

Patent No. 2,855,385                                                               October 7, 1958

John C. Petropoulos

It is hereby certified that error appears in the printed specification of the above numbered patent requiring correction and that the said Letters Patent should read as corrected below.

Column 3, line 63, for "vesesl" read -- vessel --; column 5, line 66, for "aminophenyl-" read -- aminophenyl)- --; column 6, line 31, for "1-(4-ethyl-3-thiocyanatophenyl)" read -- 1-(4-ethyl-3-isothiocyanatophenyl) --; line 44, for "3-thiocyanatophenyl)" read -- 3-isothiocyanatophenyl) --; lines 50 and 51, for "-methly-3-isothiocyanatophenyl)" read -- -methyl-3-isothiocyanatophenyl) --.

Signed and sealed this 30th day of December 1958.

(SEAL)
Attest:

KARL H. AXLINE                                                    ROBERT C. WATSON
Attesting Officer                                            Commissioner of Patents